O. Y. LADD.
LENS HOLDER FOR EYEGLASS MOUNTINGS.
APPLICATION FILED FEB. 12, 1919.
1,322,798. Patented Nov. 25, 1919.
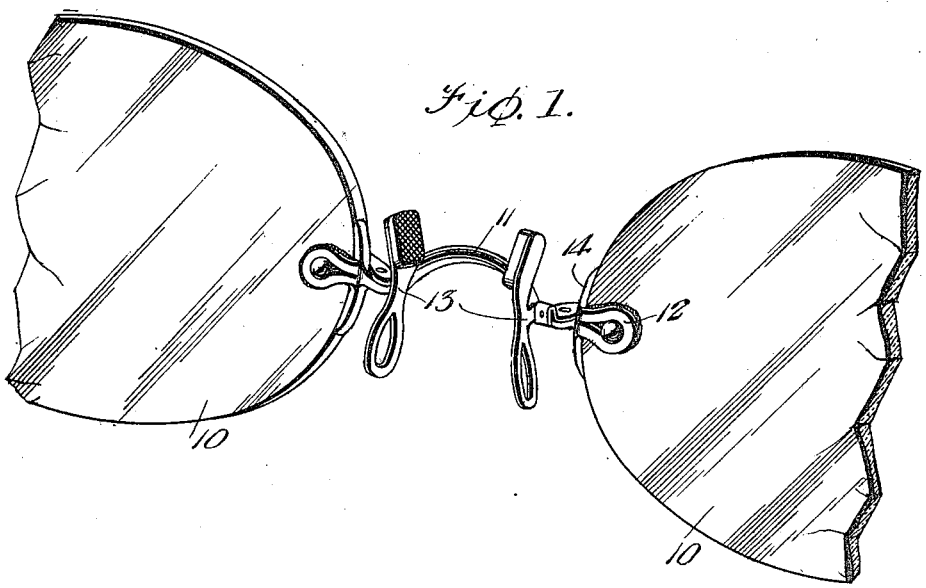
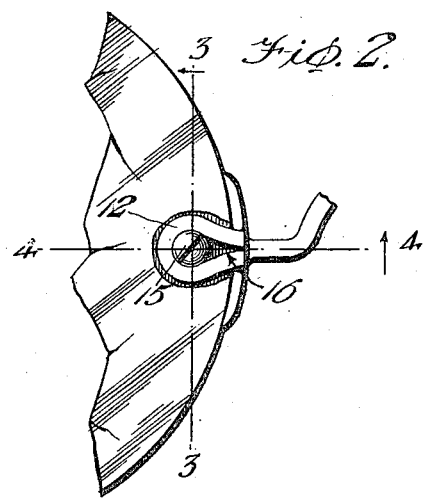
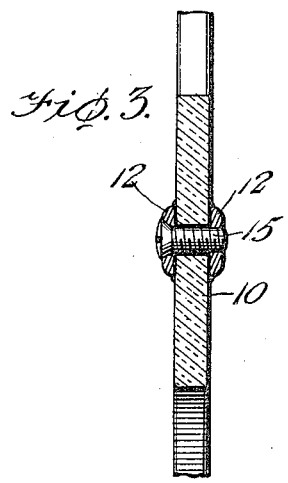
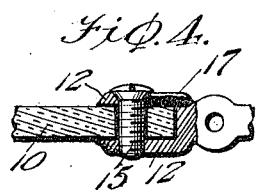
WITNESSES
R. E. Rousseau
INVENTOR
O. Y. Ladd,
BY
ATTORNEYS

UNITED STATES PATENT OFFICE.

OSMOND YONGUE LADD, OF DANBURY, CONNECTICUT.

LENS-HOLDER FOR EYEGLASS-MOUNTINGS.

1,322,798.　　　　　Specification of Letters Patent.　　Patented Nov. 25, 1919.

Application filed February 12, 1919. Serial No. 276,513.

*To all whom it may concern:*

Be it known that I, OSMOND Y. LADD, a citizen of the United States, and a resident of Danbury, in the county of Fairfield and State of Connecticut, have invented certain new and useful Improvements in Lens-Holders for Eyeglass-Mountings, of which the following is a specification.

My present invention relates generally to eye glass mountings, and more particularly to the lens holding means of rimless eye glasses, especially those of the nose clamp type, in which pivoted levers are mounted upon a bridge, the latter of which is secured by screws passing through clips, to the lens and has connection at these points only with such lens, my object being the provision of certain simple, novel means whereby the connection, ordinarily insecure, between the bridge piece and the lenses, may be made rigid and lasting, and a reinforcement for, rather than a weakening of, the lenses as at present.

In the accompanying drawing illustrating my present improvement,

Figure 1 is a perspective view showing an apparatus embodying my present invention, Fig. 2 is a partial side elevation, Fig. 3 is a vertical section taken substantially on line 3—3 of Fig. 2, and Fig. 4 is a horizontal section taken substantially on line 4—4 of Fig. 2.

Referring now to these figures, I have shown a pair of lenses 10 connected as usual to the opposite end of the bridge 11, by means of clips 12, adjacent to which the bridge 11 pivotally supports the levers 13 which engage opposite sides of the nose in use in order to support the glasses in proper position.

In the present case, and as usual, the clips 12 extend from opposite sides of each of the lens engaging bars 14, the latter of which are rigid, and are preferably integral with the extremities of the bridge 11, and these clamps 12 embrace the inner portions of the lenses 10 in substantially the plane of the longitudinal axis of the lenses, and are provided with apertures for the reception of the lens connecting screws 15 which pass through openings in the inner portion of the lenses, the screws 15 being threaded into one of the clips 12 of each pair.

So long as the screws 15 hold the connection tight and secure, and the engaging bars 14 evenly engage the respective portions of the lens peripheries, the lenses are held properly in position, but it is a matter of practical knowledge that the screws 15 quickly loosen, allowing the lenses to wabble and they thus tend to bend the engaging bars 14 out of the proper curvature and thus quickly come into a condition in which the support of the lenses depends wholly upon the fact that the screws 15 extend through the lens openings. This has a tendency to materially weaken the lenses and it is for this purpose that my invention proposes an additional opening 16 in at least one of the clips 12 of each pair, through which opening a suitable cement may be introduced into the spaces between the side faces of the lens and the clips 12 as well as the space where it passes through the lens, and in this way, when the cement hardens, the screw 15 will be securely held against displacement and all danger of loosening is thus avoided.

It is obvious, furthermore, that as this connection firmly cements the lens to the lens holder, it has a tendency to reinforce the lens, making the latter much less susceptible to breakage than heretofore, rather than weakening the same as occurs in connection with the ordinary construction now utilized.

It is also to be observed from Fig. 2 in particular that the opening 16 of one of the clips 12 is preferably made to communicate with the opening through which the screw 15 extends so that the cement, poured into the opening 16, readily finds its way onto the threads of the screw within the opening, so that when the cement hardens these threads are firmly gripped, the hardened cement being indicated at 17 in Fig. 4.

While I have described my invention as especially applied in connection with eye glasses of the nose clamp type, it is to be understood that my invention is equally applicable to all instances in which optical glasses are held in clamps or the like, doing away with the rims around the lens, for instance, rimless spectacles, goggles, or any other structure for the mounting of an optical glass without a surrounding rim, and it is to be further understood that I contemplate all of such structures wherever eye glasses are mentioned herein.

I claim:

A lens connection for lens holders including a lens engaging bar, a lens piercing screw, and clips extending from the sides of the said bar and apertured to receive the ends of the screw, one of said clips adjacent to the head of the screw having a second aperture extending from the lens bar to, and communicating with, the screw receiving aperture of the respective clip, and cement introduced through said second aperture around the screw beneath its head and between the clip and lens, to securely lock the parts rigidly in connected relation.

OSMOND YONGUE LADD.